(12) United States Patent
Huang et al.

(10) Patent No.: US 10,528,158 B2
(45) Date of Patent: Jan. 7, 2020

(54) ACTIVE STYLUS, TOUCH SENSOR, AND SIGNAL TRANSMISSION AND SENSING METHOD FOR ACTIVE STYLUS AND TOUCH SENSOR

(71) Applicant: HIMAX TECHNOLOGIES LIMITED, Tainan (TW)

(72) Inventors: Guan-Ying Huang, Tainan (TW); Yaw-Guang Chang, Tainan (TW); Chang-Hui Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 113 days.

(21) Appl. No.: 15/671,116

(22) Filed: Aug. 7, 2017

(65) Prior Publication Data
US 2019/0042008 A1    Feb. 7, 2019

(51) Int. Cl.
*G06F 3/0354* (2013.01)
*G06F 3/041* (2006.01)
*G06F 3/038* (2013.01)

(52) U.S. Cl.
CPC ........ *G06F 3/03545* (2013.01); *G06F 3/0383* (2013.01); *G06F 3/0412* (2013.01); *G06F 3/0416* (2013.01)

(58) Field of Classification Search
CPC .... G06F 3/0412; G06F 3/0416; G06F 3/0383; G06F 3/03545
USPC ................................ 345/173, 174, 176, 179
See application file for complete search history.

(56) References Cited

U.S. PATENT DOCUMENTS

| 8,928,635 | B2 * | 1/2015 | Harley | G06F 3/03545 178/19.03 |
|---|---|---|---|---|
| 2015/0153845 | A1 * | 6/2015 | Chang | G06F 3/03545 345/179 |
| 2015/0331509 | A1 * | 11/2015 | Huang | G06F 3/0416 345/173 |
| 2017/0192591 | A1 * | 7/2017 | Jang | G06F 3/03545 |

FOREIGN PATENT DOCUMENTS

| CN | 102981674 A | 3/2013 |
|---|---|---|
| TW | 201308136 A1 | 2/2013 |
| TW | 201702820 A | 1/2017 |

\* cited by examiner

*Primary Examiner* — Calvin C Ma
(74) *Attorney, Agent, or Firm* — Winston Hsu

(57) ABSTRACT

An active stylus, a touch sensor, and a signal transmission and sensing method are provided. The active stylus comprises: an integrated circuit (IC) and a transmitting circuit. The IC comprises: a first modulator, a second modulator, and a mixer. The first modulator is utilized for modulating a first signal with a first frequency to generate a first frequency modulated signal. The second modulator is utilized for modulating a second signal with a second frequency to generate a second frequency modulated signal. The mixer is coupled to the first modulator and the second modulator, and utilized for mixing the first frequency modulated signal and the second frequency modulated signal to generate a mixed signal having the first frequency and the second frequency. The transmitting circuit is coupled to the IC, and utilized for transmitting the mixed signal to the touch sensor.

20 Claims, 6 Drawing Sheets

ACTIVE STYLUS, TOUCH SENSOR, AND SIGNAL TRANSMISSION AND SENSING METHOD FOR ACTIVE STYLUS AND TOUCH SENSOR

BACKGROUND OF THE INVENTION

1. Field of the Invention

The present invention relates to an active stylus, a touch sensor, and a signal transmission and sensing method, and more particularly, to an active stylus, a touch sensor, and a signal transmission and sensing method capable of transmitting and obtaining a plurality of kinds of information at the same time.

2. Description of the Prior Art

In an in-cell capacitive touch LCD display panel, a VCOM layer is cut into a plurality of sensors with the same size and utilized for touch detection and screen display, and thus the touch detection function and the screen display update function of the VCOM layer are not capable of being performed at the same time. In other words, the VCOM layer can only perform the touch detection function for a specific period of time. Please refer to FIG. 1. FIG. 1 shows a simplified wave diagram of a touch signal TP_EN for the VCOM layer. As shown in FIG. 1, the VCOM layer performs the screen display update function in the DD intervals, and performs the touch detection function in the TP intervals. However, a conventional active stylus outputs signals with different information at different time, and thus the VCOM layer is not capable of receiving all the signals with different information at different time. Please refer to FIG. 2. FIG. 2 shows a simplified wave diagram of signals output by the conventional active stylus. As shown in FIG. 2, the signals with different information are output at different time points, and the VCOM layer is not capable of completely receiving all the signals since the VCOM layer can only perform the touch detection function for a specific period of time.

SUMMARY OF THE INVENTION

It is therefore one of the objectives of the present invention to provide an active stylus, a touch sensor, and a signal transmission and sensing method capable of transmitting and obtaining a plurality of kinds of information at the same time, so as to solve the above problem.

In accordance with an embodiment of the present invention, an active stylus for a touch sensor is disclosed. The active stylus comprises: an integrated circuit (IC) and a transmitting circuit. The IC comprises: a first modulator, a second modulator, and a mixer. The first modulator is utilized for modulating a first signal with a first frequency to generate a first frequency modulated signal. The second modulator is utilized for modulating a second signal with a second frequency to generate a second frequency modulated signal. The mixer is coupled to the first modulator and the second modulator, and utilized for mixing the first frequency modulated signal and the second frequency modulated signal to generate a mixed signal having the first frequency and the second frequency. The transmitting circuit is coupled to the IC, and utilized for transmitting the mixed signal to the touch sensor.

In accordance with an embodiment of the present invention, a touch sensor for an active stylus is disclosed. The touch sensor comprises: a sensing circuit and an integrated circuit (IC), and the sensing circuit is utilized for sensing a mixed signal from the active stylus. The IC is coupled to the sensing circuit, and comprises: a first demodulator, a second demodulator, and a processing circuit. The first demodulator is utilized for demodulating the mixed signal with a first frequency to generate a first frequency demodulated signal. The second demodulator is utilized for demodulating the mixed signal with a second frequency to generate a second frequency demodulated signal. The processing circuit is coupled to the first demodulator and the second demodulator, and utilized for processing the first frequency demodulated signal and the second frequency demodulated signal to obtain information carried by the first frequency demodulated signal and the second frequency demodulated signal.

In accordance with an embodiment of the present invention, signal transmission and sensing method for an active stylus and a touch sensor is disclosed. The signal transmission and sensing method comprises: modulating a first signal with a first frequency to generate a first frequency modulated signal; modulating a second signal with a second frequency to generate a second frequency modulated signal; mixing the first frequency modulated signal and the second frequency modulated signal to generate a mixed signal having the first frequency and the second frequency; transmitting the mixed signal to the touch sensor; sensing the mixed signal from the active stylus; demodulating the mixed signal with the first frequency to generate a first frequency demodulated signal; demodulating the mixed signal with the second frequency to generate a second frequency demodulated signal; and processing the first frequency demodulated signal and the second frequency demodulated signal to obtain information carried by the first frequency demodulated signal and the second frequency demodulated signal.

Briefly summarized, the active stylus, the touch sensor, and the signal transmission and sensing method disclosed by the embodiments are capable of transmitting and obtaining a plurality of kinds of information at the same time, and solving the problems of missing information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
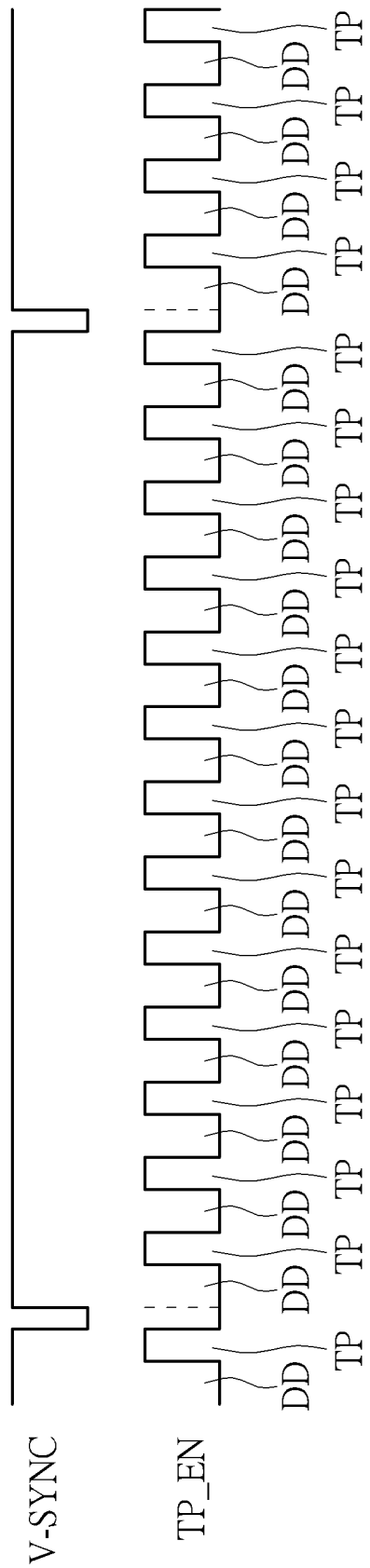
FIG. 1 shows a simplified wave diagram of a touch signal TP_EN for the VCOM layer.
Figure 2:
FIG. 2 shows a simplified wave diagram of signals output by the conventional active stylus.
Figure 3:
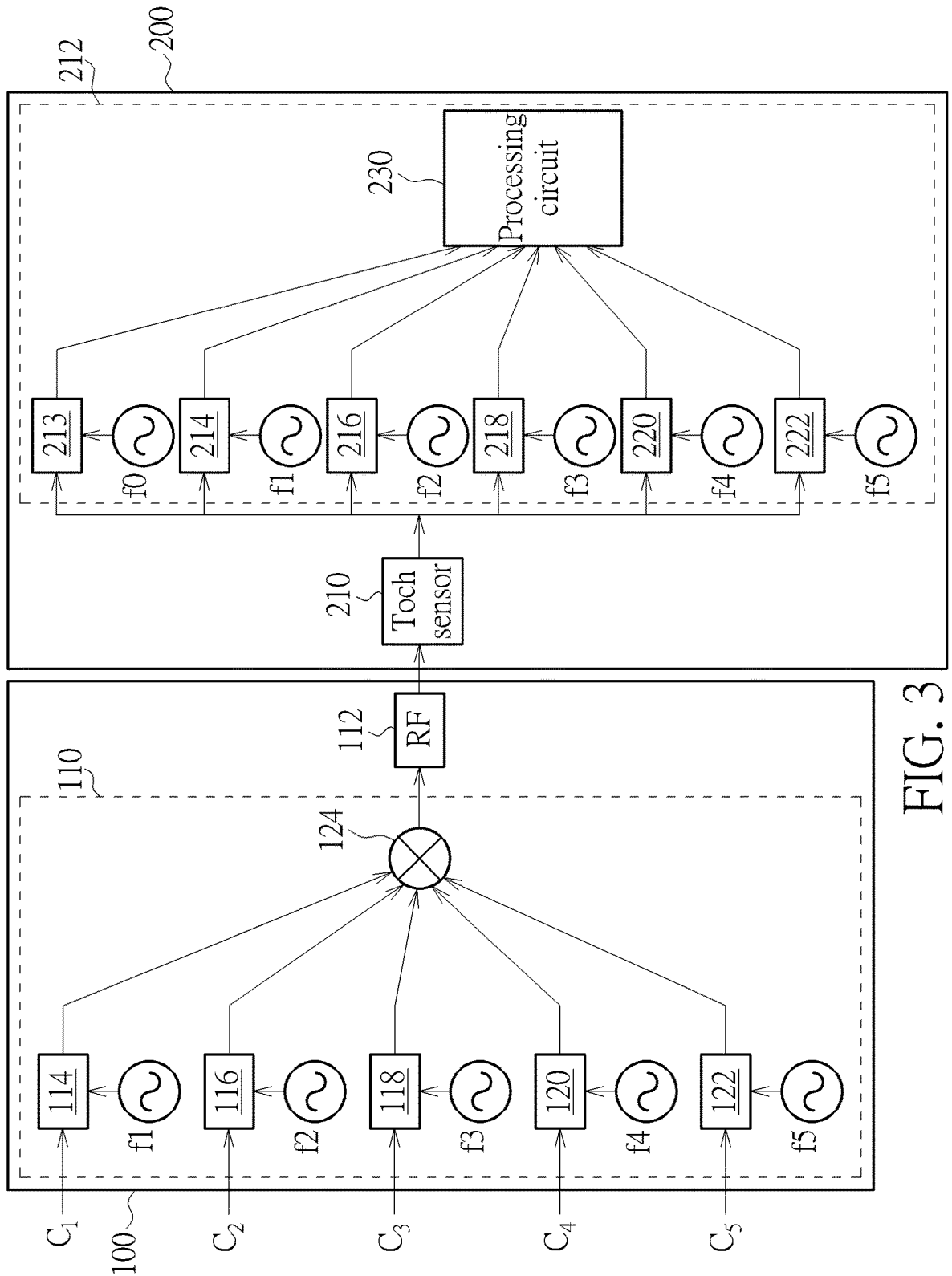
FIG. 3 shows a simplified block diagram of an active stylus and a touch sensor in accordance with an embodiment of the present invention

Please refer to FIG. 3. FIG. 3 shows a simplified block diagram of an active stylus 100 and a touch sensor 200 in accordance with an embodiment of the present invention, wherein the touch sensor 200 can be an in-cell touch driver display IC in a touch LCD display panel. As shown in FIG. 3, the active stylus 100 comprises: an integrated circuit (IC) 110 and a transmitting circuit 112. The IC 110 comprises: a first modulator 114, a second modulator 116, a third modulator 118, a fourth modulator 120, a fifth modulator 122, and a mixer 124. The first modulator 114 is utilized for modulating a first signal C1 with a first frequency f1 to generate a first frequency modulated signal. The second modulator 116 is utilized for modulating a second signal C2 with a second frequency f2 to generate a second frequency modulated signal. The third modulator 118 is utilized for modulating a third signal C3 with a third frequency f3 to generate a third frequency modulated signal. The fourth modulator 120 is utilized for modulating a fourth signal C4 with a fourth frequency f4 to generate a fourth frequency modulated signal. The fifth modulator 122 is utilized for modulating a fifth signal C5 with a fifth frequency f5 to generate a fifth frequency modulated signal. The mixer 124 is coupled to the first modulator 114, the second modulator 116, the third modulator 118, the fourth modulator 120, and the fifth modulator 122, and utilized for mixing the first frequency modulated signal, the second frequency modulated signal, the third frequency modulated signal, the fourth frequency modulated signal, and the fifth frequency modulated signal to generate a mixed signal having the first frequency f1, the second frequency f2, the third frequency f3, the fourth frequency f4, and the fifth frequency f5. The transmitting circuit 112 is coupled to the IC 110, and utilized for transmitting the mixed signal to the touch sensor 200, wherein the transmitting circuit 112 can be a radio frequency (RF) circuit.

The touch sensor 200 comprises: a sensing circuit 210 and an integrated circuit (IC) 212, and the sensing circuit 210 is utilized for sensing the mixed signal from the active stylus 100. The IC 212 is coupled to the sensing circuit 210, and comprises: a demodulator 213, a first demodulator 214, a second demodulator 216, a third demodulator 218, a fourth demodulator 220, a fifth demodulator 222, and a processing circuit 230. The demodulator 213 is utilized for demodulating the mixed signal with a frequency f0 to generate a frequency demodulated signal. The first demodulator 214 is utilized for demodulating the mixed signal with the first frequency f1 to generate a first frequency demodulated signal. The second demodulator 216 is utilized for demodulating the mixed signal with a second frequency f2 to generate a second frequency demodulated signal. The third demodulator 218 is utilized for demodulating the mixed signal with the third frequency f3 to generate a third frequency demodulated signal. The fourth demodulator 220 is utilized for demodulating the mixed signal with a fourth frequency f4 to generate a fourth frequency demodulated signal. The fifth demodulator 220 is utilized for demodulating the mixed signal with a fifth frequency f5 to generate a fifth frequency demodulated signal. The processing circuit 230 is coupled to the demodulator 213, the first demodulator 214, the second demodulator 216, the third demodulator 218, the fourth demodulator 220, and the fifth demodulator 222, and utilized for processing the frequency demodulated signal, the first frequency demodulated signal, the second frequency demodulated signal, the third frequency demodulated signal, the fourth frequency demodulated signal, and the fifth frequency demodulated signal to obtain information carried by the frequency demodulated signal, the first frequency demodulated signal, the second frequency demodulated signal, the third frequency demodulated signal, the fourth frequency demodulated signal, and the fifth frequency demodulated signal.

Figure 4:
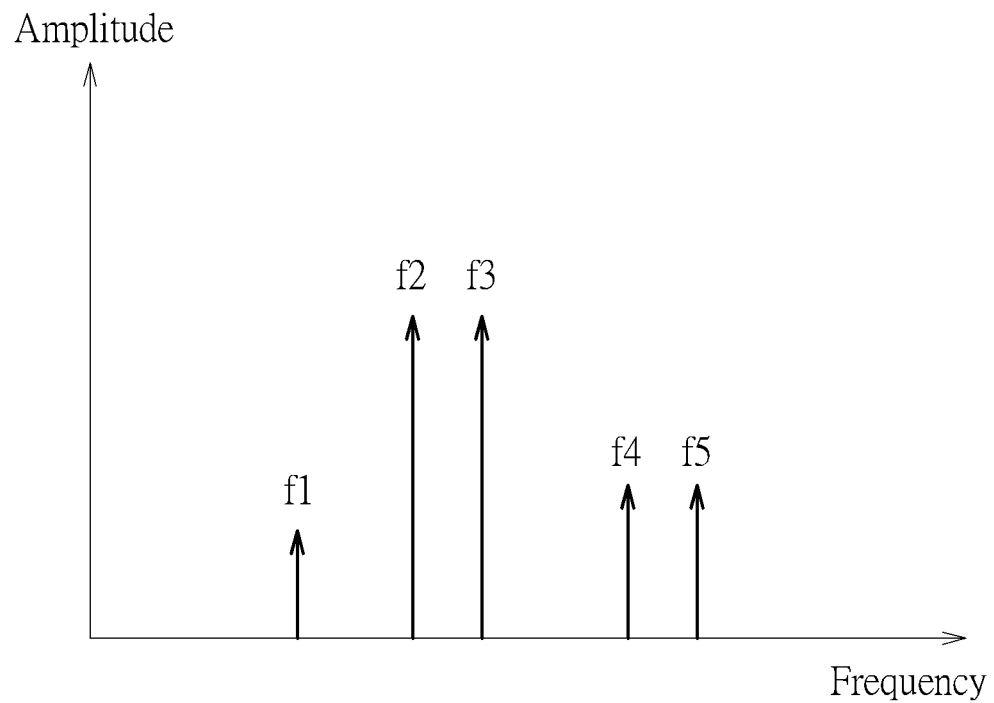
FIG. 4 shows a simplified diagram of phases and amplitudes of the first frequency f1, the second frequency f2, the third frequency f3, the fourth frequency f4, and the fifth frequency f5.
Figure 4:
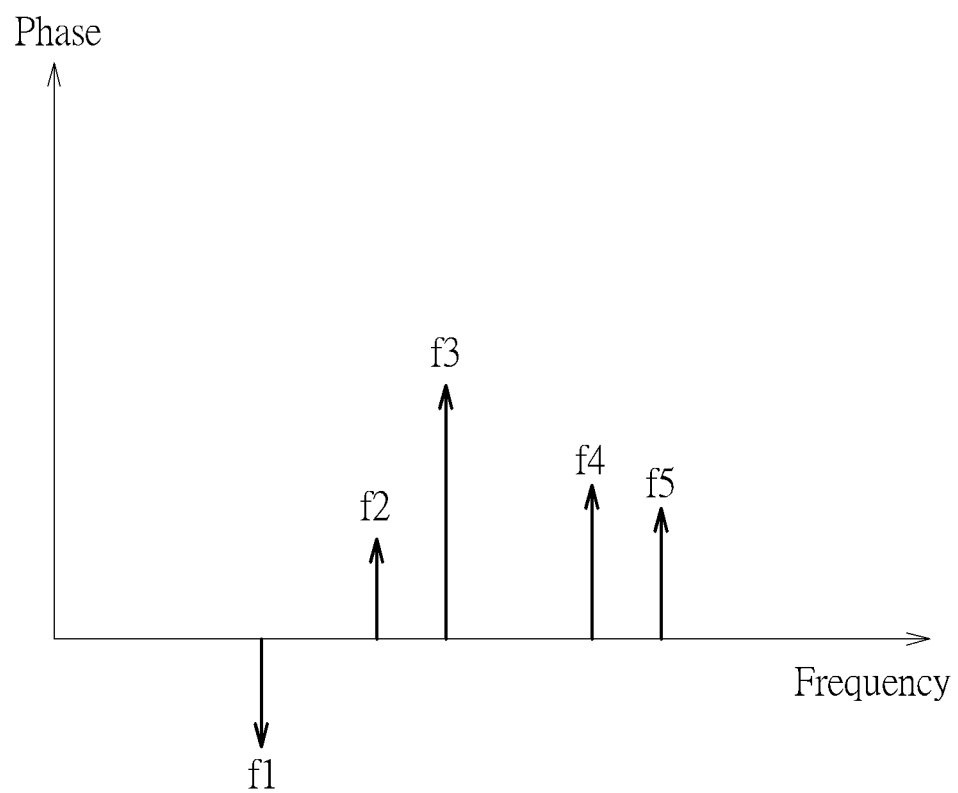

For example, please refer to FIG. 4. FIG. 4 shows a simplified diagram of phases and amplitudes of the first frequency f1, the second frequency f2, the third frequency f3, the fourth frequency f4, and the fifth frequency f5. As shown in FIG. 4, the first frequency modulated signal carries information defined by a first phase and a first amplitude of the first frequency f1, and the information carried by the first frequency modulated signal can be beacon information about position and moving path of the active stylus 100. The second frequency modulated signal carries information defined by a second phase and a second amplitude of the second frequency f2, and the information carried by the second frequency modulated signal can be a first pressure information about a first pressure of the active stylus 100. The third frequency modulated signal carries information defined by a third phase and a third amplitude of the third frequency f3, and the information carried by the third frequency modulated signal can be a second pressure information about a second pressure of the active stylus 100. The fourth frequency modulated signal carries information defined by a fourth phase and a fourth amplitude of the fourth frequency f4, and the information carried by the fourth frequency modulated signal can be a first digital information about a first status of the active stylus 100. The fifth frequency modulated signal carries information defined by a fifth phase and a fifth amplitude of the fifth frequency f5, and the information carried by the fifth frequency modulated signal can be a second digital information about a second status of the active stylus 100. The mixer 124 mixes the first frequency modulated signal, the second frequency modulated signal, the third frequency modulated signal, the fourth frequency modulated signal, and the fifth frequency modulated signal to generate the mixed signal having the first frequency f1, the second frequency f2, the third frequency f3, the fourth frequency f4, and the fifth frequency f5. The transmitting circuit 112 constantly transmits the mixed signal to the touch sensor 200, and thus the invention can transmit a plurality of kinds of information at the same time.

Next, the sensing circuit 210 senses the mixed signal from the active stylus 100, and the demodulator 213, the first demodulator 214, the second demodulator 216, the third demodulator 218, the fourth demodulator 220, and the fifth demodulator 222 demodulate the mixed signal to generate the frequency demodulated signal, the first frequency demodulated signal, the second frequency demodulated signal, the third frequency demodulated signal, the fourth frequency demodulated signal, and the fifth frequency demodulated signal, respectively. The frequency demodulated signal carries information defined by a phase and an amplitude of the frequency f0 (e.g. a capacitor sensing frequency of the in-cell touch driver display IC), and the information carried by the frequency demodulated signal can be position information of the touch panel. The first frequency demodulated signal carries information defined by the first phase and the first amplitude of the first frequency f1, and the information carried by the first frequency modulated signal can be beacon information about position and moving path of the active stylus 100. The second frequency demodulated signal carries the information defined by the second phase and the second amplitude of the second frequency f2, and the information carried by the second frequency demodulated signal is the first pressure information about a first pressure of the active stylus 100. The third frequency demodulated signal carries the information defined by the third phase and the third amplitude of the third frequency f3, and the information carried by the third frequency demodulated signal is the second pressure information about the second pressure of the active stylus 100. The fourth frequency demodulated signal carries information defined by the fourth phase and the fourth amplitude of the fourth frequency f4, and the information carried by the fourth frequency demodulated signal is the first digital information about the first status of the active stylus 100. The fifth frequency demodulated signal carries information defined by the fifth phase and the fifth amplitude of the fifth frequency f5, and the information carried by the fifth frequency demodulated signal is the second digital information about the second status of the active stylus 100. The sensing circuit 210 senses the mixed signal from the active stylus 100, and the processing circuit 230 processes the five frequency demodulated signals simultaneously, and thus the invention can obtain the plurality of kinds of information at the same time according to the phases and the amplitudes of the first frequency f1, the second frequency f2, the third frequency f3, the fourth frequency f4, and the fifth frequency f5. Please note that the above embodiment is only for illustrative purposes and is not meant to be a limitation of the present invention. For example, the number of the modulators in the active stylus 100 and the demodulators in the touch sensor 200 can be changed according to different design requirements.

Figure 5A:
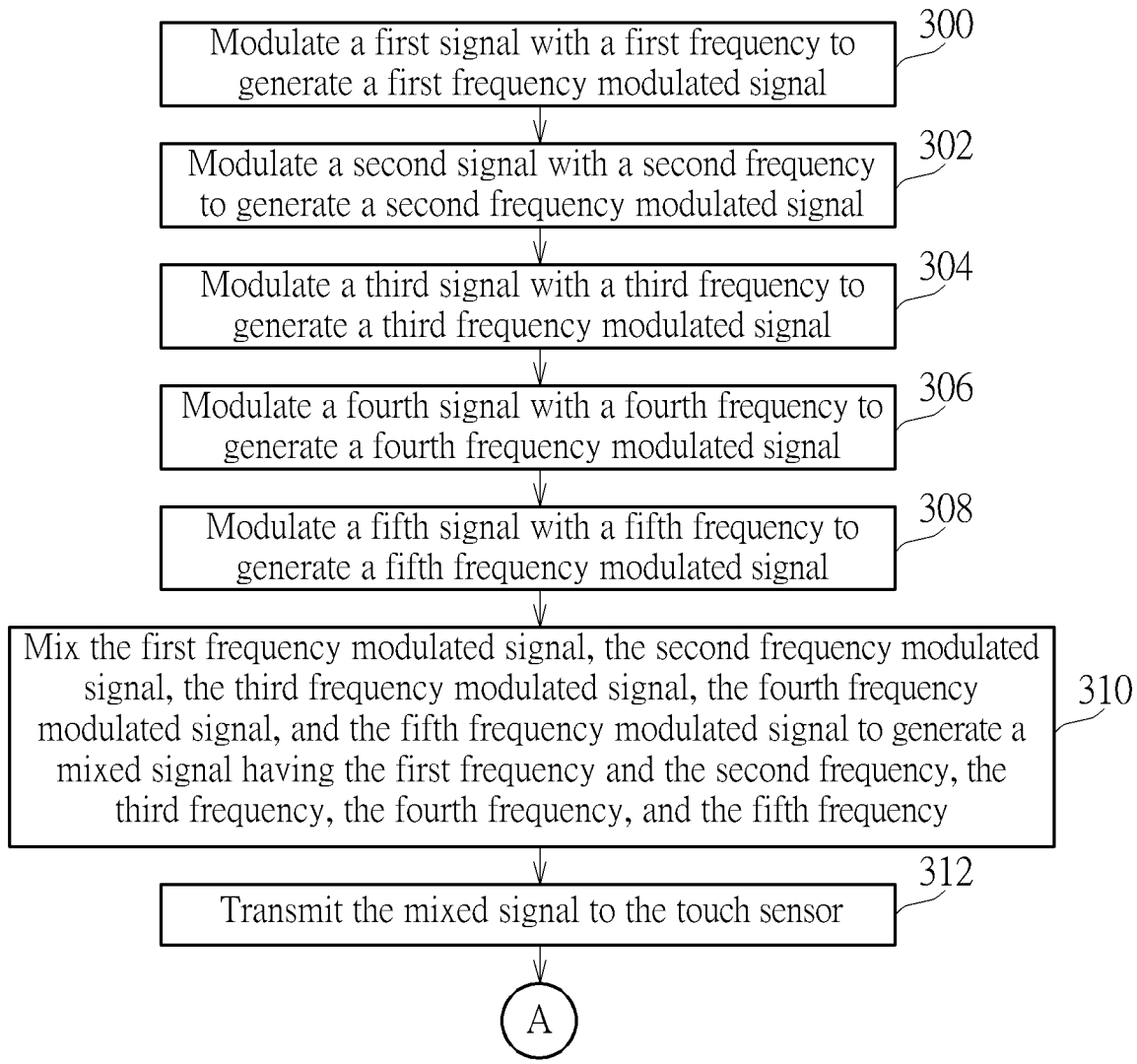
FIGS. 5A-5B show a flowchart of a signal transmission and sensing method for the active stylus and the touch sensor in the above embodiment of the present invention.
Figure 5B:
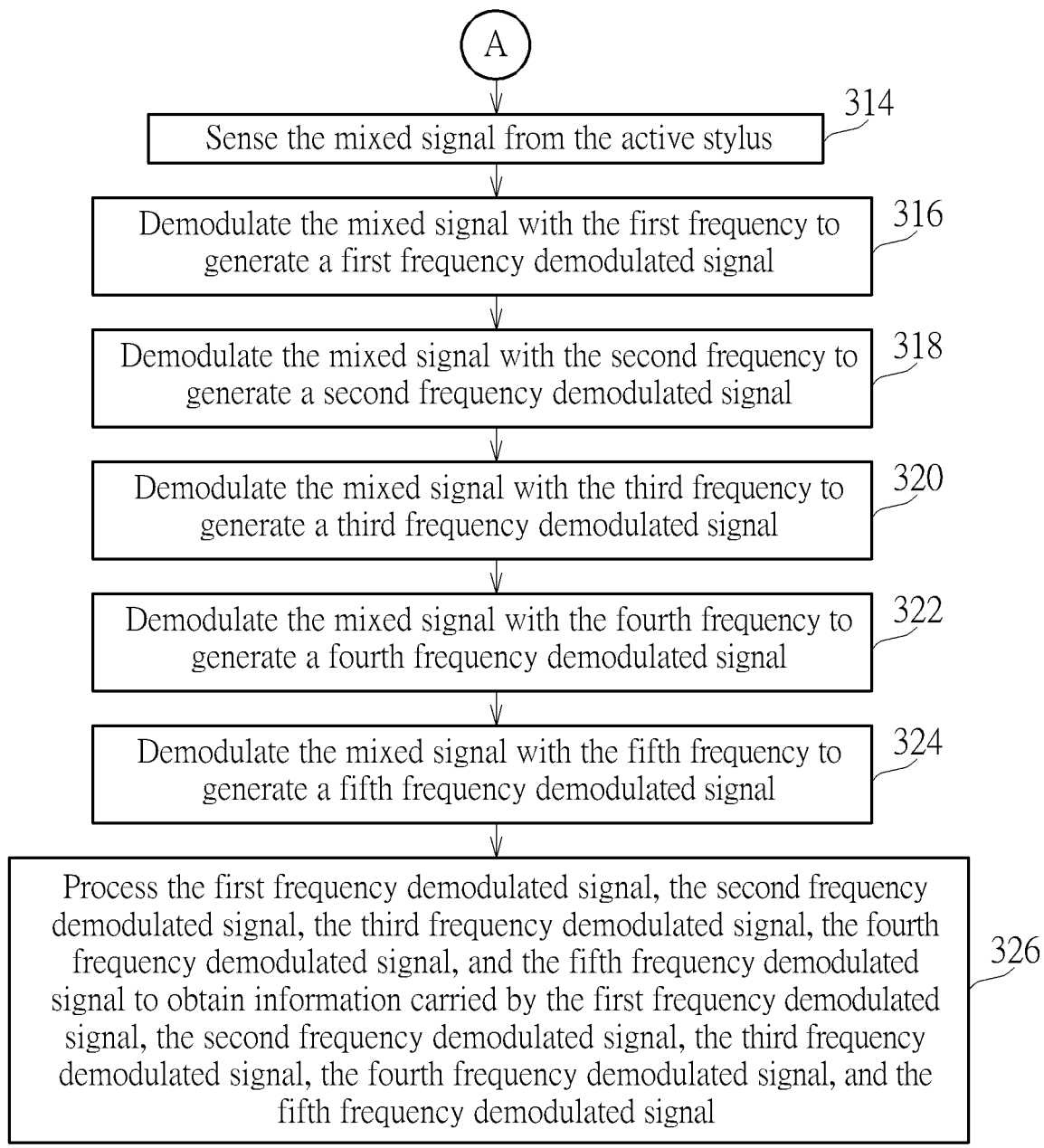

Please refer to FIGS. 5A-5B. FIGS. 5A-5B show a flowchart of a signal transmission and sensing method for the active stylus and the touch sensor in the above embodiment of the present invention. Provided that substantially the same result is achieved, the steps of the process flowchart do not have to be in the exact order shown in FIGS. 5A-5B and need not be contiguous, meaning that other steps can be intermediate or certain steps can be ignored. The signal transmission and sensing method comprises the following steps:

Step 300: Modulate a first signal with a first frequency to generate a first frequency modulated signal.

Step 302: Modulate a second signal with a second frequency to generate a second frequency modulated signal.

Step 304: Modulate a third signal with a third frequency to generate a third frequency modulated signal.

Step 306: Modulate a fourth signal with a fourth frequency to generate a fourth frequency modulated signal.

Step 308: Modulate a fifth signal with a fifth frequency to generate a fifth frequency modulated signal.

Step 310: Mix the first frequency modulated signal, the second frequency modulated signal, the third frequency modulated signal, the fourth frequency modulated signal, and the fifth frequency modulated signal to generate a mixed signal having the first frequency and the second frequency, the third frequency, the fourth frequency, and the fifth frequency.

Step 312: Transmit the mixed signal to the touch sensor.

Step 314: Sense the mixed signal from the active stylus

Step 316: Demodulate the mixed signal with the first frequency to generate a first frequency demodulated signal.

Step 318: Demodulate the mixed signal with the second frequency to generate a second frequency demodulated signal.

Step 320: Demodulate the mixed signal with the third frequency to generate a third frequency demodulated signal.

Step 322: Demodulate the mixed signal with the fourth frequency to generate a fourth frequency demodulated signal.

Step 324: Demodulate the mixed signal with the fifth frequency to generate a fifth frequency demodulated signal.

Step 326: Process the first frequency demodulated signal, the second frequency demodulated signal, the third frequency demodulated signal, the fourth frequency demodulated signal, and the fifth frequency demodulated signal to obtain information carried by the first frequency demodulated signal, the second frequency demodulated signal, the third frequency demodulated signal, the fourth frequency demodulated signal, and the fifth frequency demodulated signal.

Briefly summarized, the active stylus, the touch sensor, and the signal transmission and sensing method disclosed by the embodiments are capable of transmitting and obtaining a plurality of kinds of information at the same time, and solving the problems of missing information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active stylus for a touch sensor, comprising:
   an integrated circuit (IC), comprising:
      a first modulator, for modulating a first signal with a first frequency to generate a first frequency modulated signal, the first signal carrying a first information;
      a second modulator, for modulating a second signal with a second frequency different from the first frequency to generate a second frequency modulated signal, the second signal carrying a second information different from the first information; and
      a mixer, coupled to the first modulator and the second modulator, for mixing the first frequency modulated signal and the second frequency modulated signal to generate a mixed signal having the first frequency and the second frequency; and
   a transmitting circuit, coupled to the IC, for transmitting the mixed signal to the touch sensor so that both the first frequency modulated signal and the second frequency modulated signal are received by the touch sensor at a same time.

2. The active stylus of claim 1, wherein the first frequency modulated signal carries information defined by a first phase and a first amplitude of the first frequency, and the second frequency modulated signal carries information defined by a second phase and a second amplitude of the second frequency.

3. The active stylus of claim 1, wherein the first signal carries a beacon information, and the second signal carries a pressure information.

4. The active stylus of claim 1, wherein the IC further comprises a third modulator for modulating a third signal with a third frequency different from the first frequency and the second frequency to generate a third frequency modulated signal, the third frequency carrying a third information different from the first information and the second information; and the mixer further mixes the third frequency modulated signal to generate a mixed signal having the first frequency, the second frequency, and the third frequency.

5. The active stylus of claim 4, wherein the third frequency modulated signal carries information defined by a third phase and a third amplitude of the third frequency.

6. The active stylus of claim 4, wherein the third signal carries a digital information.

7. The active stylus of claim 1, wherein the touch sensor is an in-cell touch driver display IC in a touch panel.

8. A touch sensor for an active stylus, comprising:
   a sensing circuit, for sensing a mixed signal comprising a first frequency modulated signal and a second frequency modulated signal from the active stylus so that the first frequency modulated signal and the second frequency modulated signal are sensed at a same time; and
   an integrated circuit (IC), coupled to the sensing circuit, comprising:
      a first demodulator, for demodulating the mixed signal with a first frequency to generate a first frequency demodulated signal, the first frequency demodulated signal carrying a first information;
      a second demodulator, for demodulating the mixed signal with a second frequency different from the first frequency to generate a second frequency demodulated signal, the second frequency demodulated signal carrying a second information different from the first information; and
      a processing circuit, coupled to the first demodulator and the second demodulator, for processing the first frequency demodulated signal and the second frequency demodulated signal to obtain the first information carried by the first frequency demodulated signal and the second information carried by the second frequency demodulated signal.

9. The touch sensor of claim 8, wherein the first frequency demodulated signal carries information defined by a first phase and a first amplitude of the first frequency, and the second frequency demodulated signal carries information defined by a second phase and a second amplitude of the second frequency.

10. The touch sensor of claim 8, wherein the processing circuit processes the first frequency demodulated signal to obtain a beacon information, and processes the second frequency demodulated signal to obtain a pressure information.

11. The touch sensor of claim 8, wherein the IC further comprises a third demodulator for demodulating the mixed signal with a third frequency different from the first frequency and the second frequency to generate a third frequency demodulated signal, the third frequency demodulated signal carrying a third information different from the first information and the second information; and the processing circuit further processes the third frequency demodulated signal to obtain the third information carried by the third demodulated signal.

12. The touch sensor of claim 11, wherein the third frequency modulated signal carries information defined by a third phase and a third amplitude of the third frequency.

13. The touch sensor of claim 11, wherein the processing circuit processes the third frequency demodulated signal to obtain a digital information.

14. A signal transmission and sensing method for an active stylus and a touch sensor, comprising:
   modulating a first signal with a first frequency to generate a first frequency modulated signal, the first signal carrying a first information;
   modulating a second signal with a second frequency different from the first frequency to generate a second frequency modulated signal, the second signal carrying a second information different from the first information;
   mixing the first frequency modulated signal and the second frequency modulated signal to generate a mixed signal having the first frequency and the second frequency;
   transmitting the mixed signal to the touch sensor so that both the first frequency modulated signal and the second frequency modulated signal are received by the touch sensor at a same time;
   sensing the mixed signal from the active stylus;
   demodulating the mixed signal with the first frequency to generate a first frequency demodulated signal;
   demodulating the mixed signal with the second frequency to generate a second frequency demodulated signal; and
   processing the first frequency demodulated signal and the second frequency demodulated signal to obtain the first information carried by the first frequency demodulated signal and the second information carried by the second frequency demodulated signal;
   a transmitting circuit, coupled to the IC, for transmitting the mixed signal.

15. The signal transmission and sensing method of claim 14, wherein the first frequency modulated signal and the first frequency demodulated signal carry information defined by a first phase and a first amplitude of the first frequency, and the second frequency modulated signal and the second frequency demodulated signal carry information defined by a second phase and a second amplitude of the second frequency.

16. The signal transmission and sensing method of claim 14, wherein the first signal carries a beacon information, and the second signal carries a pressure information, and the processing circuit processes the first frequency demodulated signal to obtain the beacon information, and processes the second frequency demodulated signal to obtain the pressure information.

17. The signal transmission and sensing method of claim 14, further comprising:
   modulating a third signal with a third frequency different from the first frequency and the second frequency to generate a third frequency modulated signal, the third signal carrying a third information different from the first information and the second information; and
   demodulating the mixed signal with the third frequency to generate a third frequency demodulated signal; and
   processing the third frequency demodulated signal to obtain the third information carried by the third frequency demodulated signal;
   wherein the step of mixing the first frequency modulated signal and the second frequency modulated signal to generate the mixed signal having the first frequency and the second frequency further comprises:

mixing the third frequency modulated signal to generate the mixed signal having the first frequency, the second frequency, and the third frequency.

18. The signal transmission and sensing method of claim 17, wherein the third frequency modulated signal and the third frequency demodulated signal carry information defined by a third phase and a third amplitude of the third frequency.

19. The signal transmission and sensing method of claim 17, wherein the third signal carries a digital information, and the processing circuit processes the third frequency demodulated signal to obtain the digital information.

20. The signal transmission and sensing method of claim 14, wherein the touch sensor is an in-cell touch driver display IC in a touch panel.

* * * * *